US012799630B2

(12) United States Patent
Yao et al.

(10) Patent No.: US 12,799,630 B2
(45) Date of Patent: Nov. 17, 2026

(54) BAMBOO FIBER PRODUCTION DEVICE

(71) Applicants: Jiyang College of Zhejiang A&F University, Zhuji (CN); Sichuan Zhusi New Material Technology Co., Ltd., Yibin (CN)

(72) Inventors: Wenbin Yao, Hangzhou (CN); Wei Zhang, Hangzhou (CN); Weipeng Yu, Hangzhou (CN)

(73) Assignees: Jiyang College of Zhejiang A&F University, Zhuji (CN); Sichuan Zhusi New Material Technology Co., Ltd., Yibin (CN)

( * ) Notice: Subject to any disclaimer, the term of this patent is extended or adjusted under 35 U.S.C. 154(b) by 977 days.

(21) Appl. No.: 18/097,441

(22) Filed: Jan. 16, 2023

(65) Prior Publication Data

US 2024/0191399 A1 Jun. 13, 2024

(30) Foreign Application Priority Data

Dec. 10, 2022 (CN) ......................... 202211584829.1

(51) Int. Cl.
*D01C 1/00* (2006.01)
*B27K 9/00* (2006.01)
*F26B 3/28* (2006.01)

(52) U.S. Cl.
CPC ................ *D01C 1/00* (2013.01); *B27K 9/002* (2013.01); *F26B 3/28* (2013.01); *D10B 2201/10* (2013.01); *F26B 2200/02* (2013.01)

(58) Field of Classification Search
CPC .......... F26B 3/28; F26B 2200/02; D01C 1/00; D10B 2201/10; B27K 9/002
USPC ........................................................... 34/108
See application file for complete search history.

(56) References Cited

U.S. PATENT DOCUMENTS

| | | | | |
|---|---|---|---|---|
| 5,713,139 A * | 2/1998 | Briggs | F26B 21/00 432/105 |
| 5,909,943 A * | 6/1999 | Poirier | F26B 25/002 34/172 |
| 6,167,637 B1 * | 1/2001 | Nagase | B01D 29/822 34/388 |

(Continued)

FOREIGN PATENT DOCUMENTS

| | | | | |
|---|---|---|---|---|
| CN | 211261514 U | * | 8/2020 | |
| JP | 2008264756 A | * | 11/2008 | F26B 5/04 |
| KR | 20100014925 A | * | 2/2010 | F26B 5/04 |

*Primary Examiner* — Stephen M Gravini
(74) *Attorney, Agent, or Firm* — Birchwood IP

(57) ABSTRACT

A bamboo fiber production device includes a base and a drying cylinder, two electric heating plates are fixedly connected to an inner right side wall of the drying cylinder symmetrically, a screen cylinder is arranged inside the drying cylinder, two groups of connecting rods are fixedly connected to a side wall of the screen cylinder symmetrically, the other end of each of the connecting rods is fixedly connected to an inner wall of the drying cylinder; a cover plate is arranged on a left end of the drying cylinder, a connecting block is fixedly connected to a front side of the cover plate, a shaft pin is fixedly sheathed with the connecting block, L-shaped plates are rotationally connected to rod walls, the two L-shaped plates are fixedly connected to an outer wall of the drying cylinder; a drying box is fixedly connected to top outer wall of the drying cylinder.

9 Claims, 5 Drawing Sheets

(56) References Cited

U.S. PATENT DOCUMENTS

| | | | | |
|---|---|---|---|---|
| 8,202,146 | B1 * | 6/2012 | Johnson | F24F 7/06 454/187 |
| 8,365,433 | B2 * | 2/2013 | Ogura | C10B 53/02 110/251 |
| 8,464,437 | B1 * | 6/2013 | Weisselberg | F26B 17/003 34/384 |
| 9,221,027 | B2 * | 12/2015 | Kuppler | B01J 10/005 |
| 9,671,166 | B2 * | 6/2017 | Plavnik | G10K 15/04 |
| 9,726,429 | B1 * | 8/2017 | Jamaluddin | F26B 25/002 |
| 12,188,179 | B2 * | 1/2025 | Simoncini | D21F 5/181 |
| 12,624,894 | B2 * | 5/2026 | Son | F26B 13/002 |
| 12,693,072 | B2 * | 7/2026 | Wang | F26B 9/003 |
| 2024/0191399 | A1 * | 6/2024 | Yao | B27K 9/002 |

* cited by examiner

BAMBOO FIBER PRODUCTION DEVICE

CROSS-REFERENCE TO RELATED APPLICATIONS

This is a U.S. patent application which claims the priority and benefit of Chinese Patent Application Number 202211584829.1, filed on Dec. 10, 2022, the disclosure of which is incorporated herein by reference in its entirety.

TECHNICAL FIELD

The present invention relates to the technical field of bamboo fiber production, and in particular to a bamboo fiber production device.

BACKGROUND

Because bamboo charcoal fiber has very strong adsorption capacity, it can absorb harmful substances such as formaldehyde and is widely used in the field of air filtration. Bamboo is fired into bamboo charcoal at a high temperature and then prepared into a fiber material. In order to speed up the firing of bamboo, the bamboo is dried by a dryer before firing.

According to search, Chinese Patent Application No. CN112524911A discloses a bamboo charcoal fiber production device with a high drying efficiency, including a base, a sliding block, a roller and a sliding rail, wherein the sliding block is installed on a top of the base, the sliding rail is arranged outside the roller, the roller movably fits with the sliding block through the sliding rail, and a drying chamber, a bearing and a pushing mechanism are arranged on the roller; because of a small frictional force between bamboo and an inner wall of the roller, the bamboo is in a static state at a bottom of the roller for a long time; a support block of the pushing mechanism is moved and returned to push the bamboo to rotate, which is conducive to continuous contact between the bamboo surface and the inner wall of the roller, to accelerating a drying speed of the bamboo, and to uniform heating of the bamboo; because water drops are evaporated to the bamboo surface after the bamboo is heated, the water drops and impurities left on the bamboo surface slow down the evaporation of water, and the water drops and impurities on the outer wall of the bamboo are removed by a scraper of a blade, which is conducive to accelerating the evaporation of water inside the bamboo and the drying speed of the bamboo.

The above-mentioned technical solution has the following deficiencies:

In the above-mentioned technical solution, in order to ensure the drying effect of bamboo, it is necessary to rotate the roller. However, because the drying chamber is arranged inside the roller, a heating module inside the drying chamber rotates synchronously with the roller, which causes the problem that a line of the heating module will be wound, thereby affecting normal use of the whole device; moreover, after the bamboo is dried, it is difficult to take out the dried bamboo timely due to high temperature inside the roller.

SUMMARY

(I) Technical Problems Solved

In view of the deficiencies in the prior art, the present invention provides a bamboo fiber production device, which has the advantages of avoiding line winding of the heating module and ensuring a normal drying process, and solves the problem that it is difficult to take out the dried bamboo due to high temperature.

(II) Technical Solutions

To achieve the aforesaid purpose, the present invention provides the following technical solutions: a bamboo fiber production device includes a base and a drying cylinder, wherein two electric heating plates are fixedly connected to an inner right side wall of the drying cylinder symmetrically, a screen cylinder is arranged inside the drying cylinder, two groups of connecting rods are fixedly connected to a side wall of the screen cylinder symmetrically, and the other end of each of the connecting rods is fixedly connected to an inner wall of the drying cylinder; a cover plate is arranged on a left end of the drying cylinder, a connecting block is fixedly connected to a front side of the cover plate, a shaft pin is fixedly sheathed with the connecting block, L-shaped plates are rotationally connected to rod walls at both ends of the shaft pin respectively, and the two L-shaped plates are fixedly connected to an outer wall of the drying cylinder; a drying box is fixedly connected to a top outer wall of the drying cylinder, and a first air guide mechanism and a second air guide mechanism communicated with an interior of the drying box are fixedly connected at both ends of the drying box respectively; the drying cylinder is arranged above the base, two mounting plates are fixedly connected to an upper surface of the base symmetrically, a rotating rod is rotationally connected between the two mounting plates, two support plates are fixedly sheathed with a wall of the rotating rod symmetrically, and tops of the two support plates are fixedly connected to a bottom outer wall of the drying cylinder; a driving mechanism is arranged on the upper surface of the base, and the driving mechanism is transmission-connected with the rotating rod.

Preferably, the first air guide mechanism includes a first corrugated pipe, a second corrugated pipe and an air outlet pipe, wherein the cover plate is fixedly sheathed with a wall at one end of the air outlet pipe, a first three-way pipe is fixedly sheathed with a wall at the other end of the air outlet pipe, a first rigid conduit and a second rigid conduit are fixedly connected to the other two ports of the first three-way pipe respectively, the other end of the first rigid conduit is fixedly connected to the first corrugated pipe, the other end of the second rigid conduit is fixedly connected to the second corrugated pipe, and the other end of the second corrugated pipe extends into the drying box and is fixedly connected to the drying box.

Preferably, the second air guide mechanism includes a circulating fan, a second three-way pipe, a third rigid conduit, a fourth rigid conduit and an air inlet pipe, wherein the circulating fan is fixedly connected to a top outer wall of the drying cylinder, the third rigid conduit and the air inlet pipe are fixedly connected at both ends of the circulating fan respectively, the other end of the air inlet pipe extends into the drying cylinder and is fixedly connected to the drying cylinder, a wall at the other end of the third rigid conduit is fixedly connected with the fourth rigid conduit through the second three-way pipe, the other end of the fourth rigid conduit extends into the drying box and is fixedly connected to the drying box, and a cold air pipe is fixedly connected to the other port of the second three-way pipe.

Preferably, the driving mechanism includes a motor, a worm gear, a worm and two fixing plates, wherein the two fixing plates are fixedly connected to the upper surface of the base, the motor is fixedly connected to a side wall of one of the fixing plates, the worm is rotationally connected between the two fixing plates, one end of the worm passes through the corresponding fixing plates and is fixedly connected to an output end of the motor, the worm gear is fixedly sheathed with a wall of the rotating rod, and the worm is meshed with the worm gear.

Preferably, an opening is formed in a front side of the drying box, a scaling plate is hinged inside the opening, and silica-gel desiccant is placed inside the drying box.

Preferably, a support seat is fixedly connected to the upper surface of the base on the side far away from the two mounting plates, and a left end of the drying cylinder is contact-connected with the support seat.

Preferably, first solenoid valves are arranged on walls of the first rigid conduit and the second rigid conduit.

Preferably, second solenoid valves are arranged on walls of the third rigid conduit and the fourth rigid conduit.

Preferably, mounting blocks are fixedly connected at both sides of the base, and a fastening bolt is fixedly connected inside each of the mounting blocks.

(III) Beneficial Effects

Compared with the prior art, the present invention provides a bamboo fiber production device, which has the following beneficial effects:

1. According to the bamboo fiber production device, by using the first air guide mechanism and the second air guide mechanism, circulation of hot air can be realized in the heating and drying process of bamboo inside the screen cylinder, by using the drying box, adsorption and drying of water vapor carried in the flowing air are realized, so that the drying process of bamboo can be effectively accelerated; moreover, external cold air can be transported into the drying cylinder for cooling after drying, so that workers can take out the bamboo from the drying cylinder.
2. According to the bamboo fiber production device, silica-gel desiccant placed inside the drying box can be recycled after being heated and dried, so that the replacement times of the desiccant can be reduced as far as possible, and more desiccant is saved to a certain extent.

Figure 1:
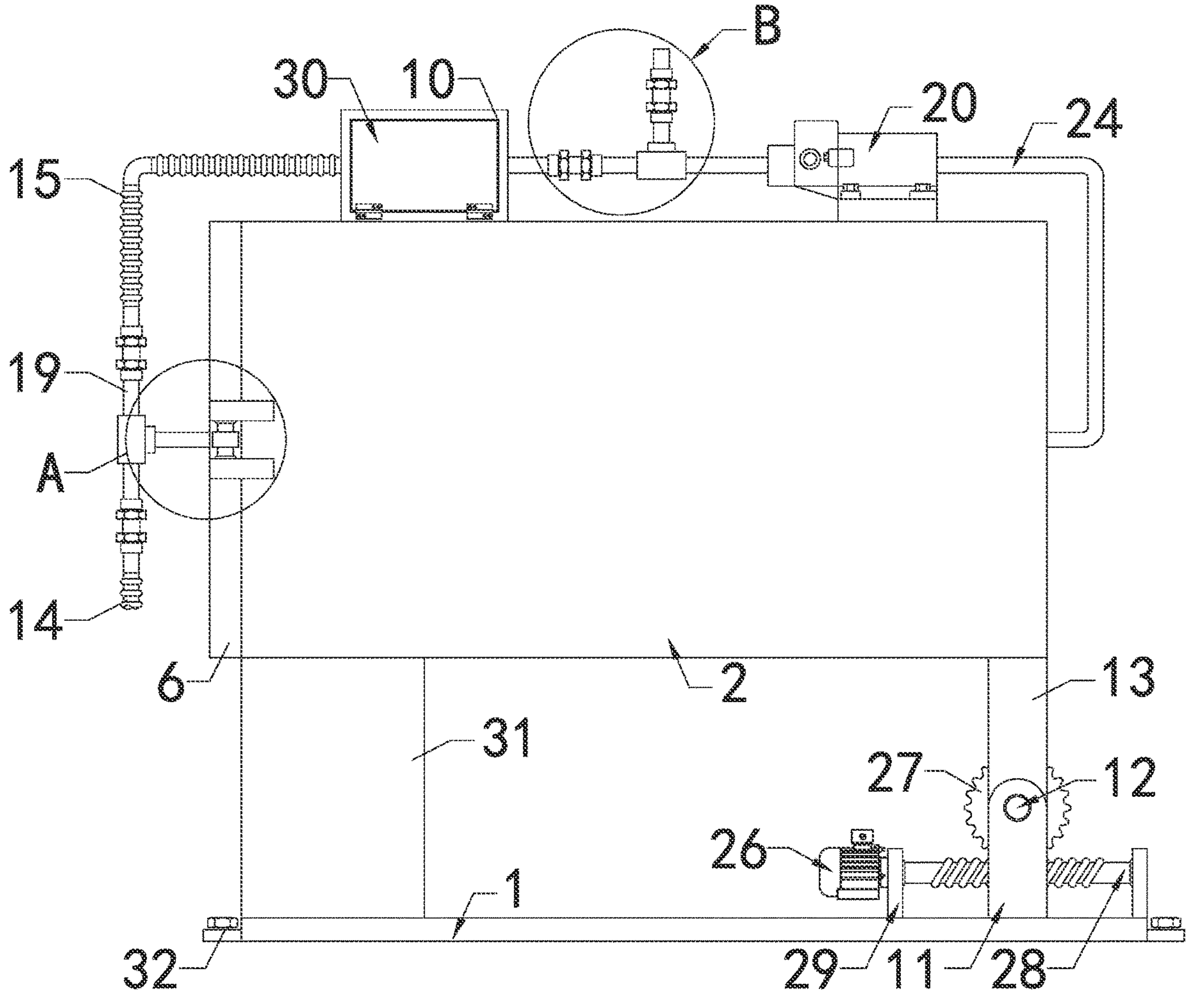
FIG. 1 is a structural view of a bamboo fiber production device provided by the present invention.

In the figures: 1. base; 2. drying cylinder; 3. electric heating plate; 4. screen cylinder; 5. connecting rod; 6. cover plate; 7. connecting block; 8. shaft pin; 9. L-shaped plate; 10. drying box; 11. mounting plate; 12. rotating rod; 13. support plate; 14. first corrugated pipe; 15. second corrugated pipe; 16. air outlet pipe; 17. first three-way pipe; 18. first rigid conduit; 19. second rigid conduit; 20. circulating fan; 21. second three-way pipe; 22. third rigid conduit; 23. fourth rigid conduit; 24. air inlet pipe; 25. cold air pipe; 26. motor, 27. worm gear, 28. worm; 29. fixing plate; 30. sealing plate; 31. support seat; 32. mounting block.

DETAILED DESCRIPTION

The technical solutions in the embodiments of the present invention will be described below clearly and completely in combination with the accompanying drawings. It is obvious that the described embodiments are only a part of, rather than all of, the embodiments of the present invention. On the basis of the embodiments in the present invention, all the other embodiments obtained by those of ordinary skill in the art without making creative efforts should fall into the protection scope of the present invention.

As shown in FIGS. 1-5, a bamboo fiber production device includes a base 1 and a drying cylinder 2, wherein two electric heating plates 3 are fixedly connected to an inner right side wall of the drying cylinder 2 symmetrically, a screen cylinder 4 is arranged inside the drying cylinder 2, two groups of connecting rods 5 are fixedly connected to a side wall of the screen cylinder 4 symmetrically, and the other end of each of the connecting rods 5 is fixedly connected to an inner wall of the drying cylinder 2; a cover plate 6 is arranged on a left end of the drying cylinder 2, a connecting block 7 is fixedly connected to a front side of the cover plate 6, a shaft pin 8 is fixedly sheathed with the connecting block 7, L-shaped plates 9 are rotationally connected to rod walls at both ends of the shaft pin 8 respectively, and the two L-shaped plates 9 are fixedly connected to an outer wall of the drying cylinder 2; a drying box 10 is fixedly connected to a top outer wall of the drying cylinder 2, and a first air guide mechanism and a second air guide mechanism communicated with an interior of the drying box 10 are fixedly connected at both ends of the drying box 10 respectively; the drying cylinder 2 is arranged above the base 1, two mounting plates 11 are fixedly connected to an upper surface of the base 1 symmetrically, a rotating rod 12 is rotationally connected between the two mounting plates 11, two support plates 13 are fixedly sheathed with a wall of the rotating rod 12 symmetrically, and tops of the two support plates 13 are fixedly connected with a bottom outer wall of the drying cylinder 2; a driving mechanism is arranged on the upper surface of the base 1, and the driving mechanism is transmission-connected with the rotating rod 12.

Figure 2:
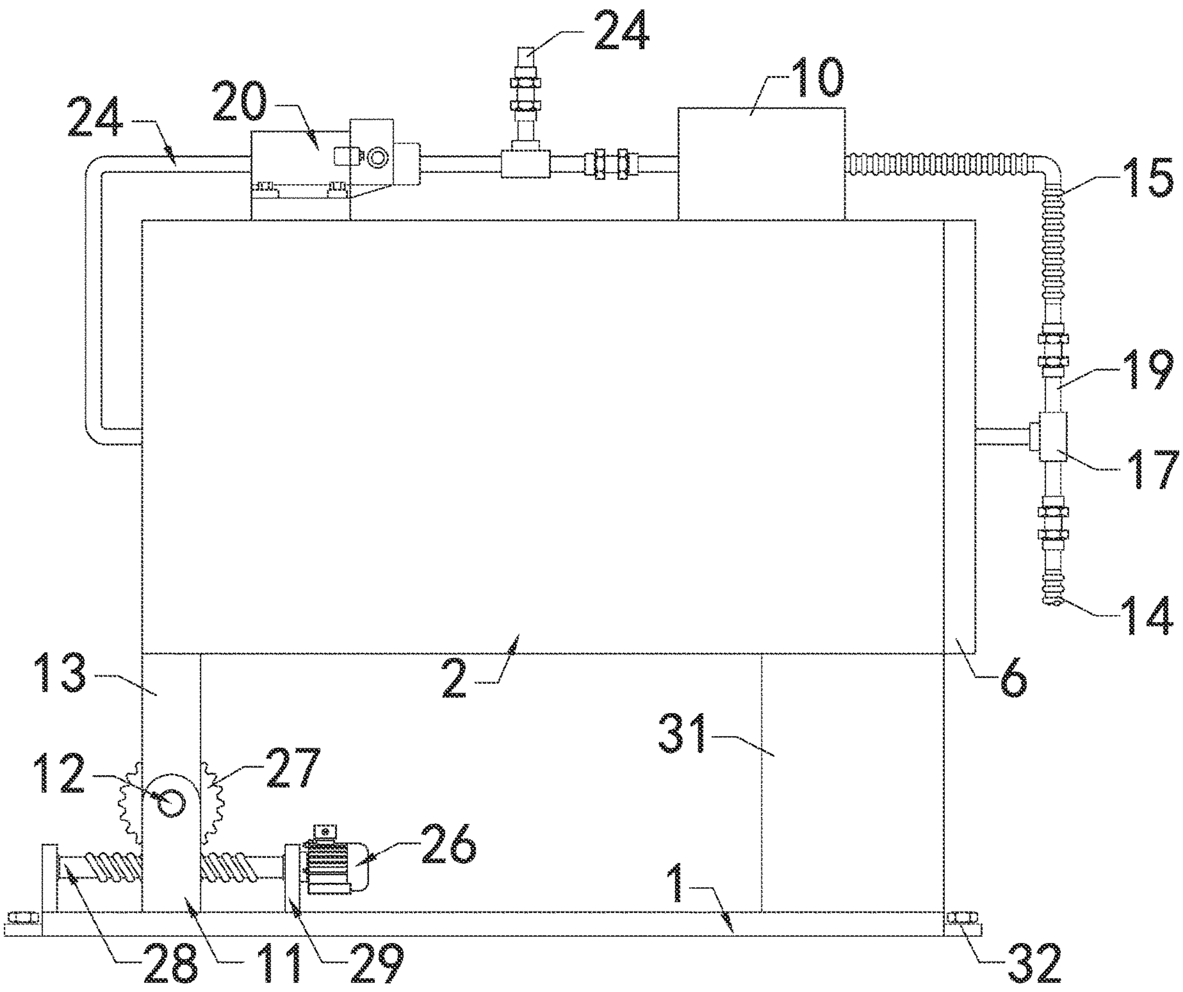
FIG. 2 is a rear view of FIG. 1.
Figure 3:
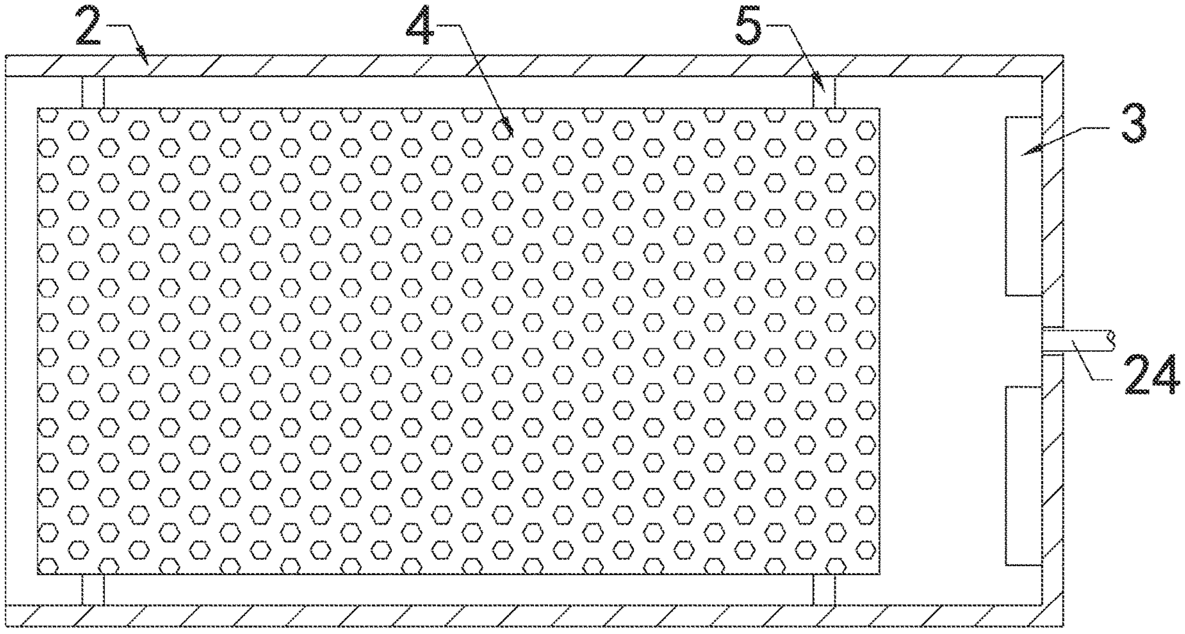
FIG. 3 is a sectional structural view of a drying cylinder in FIG. 1.
Figure 4:
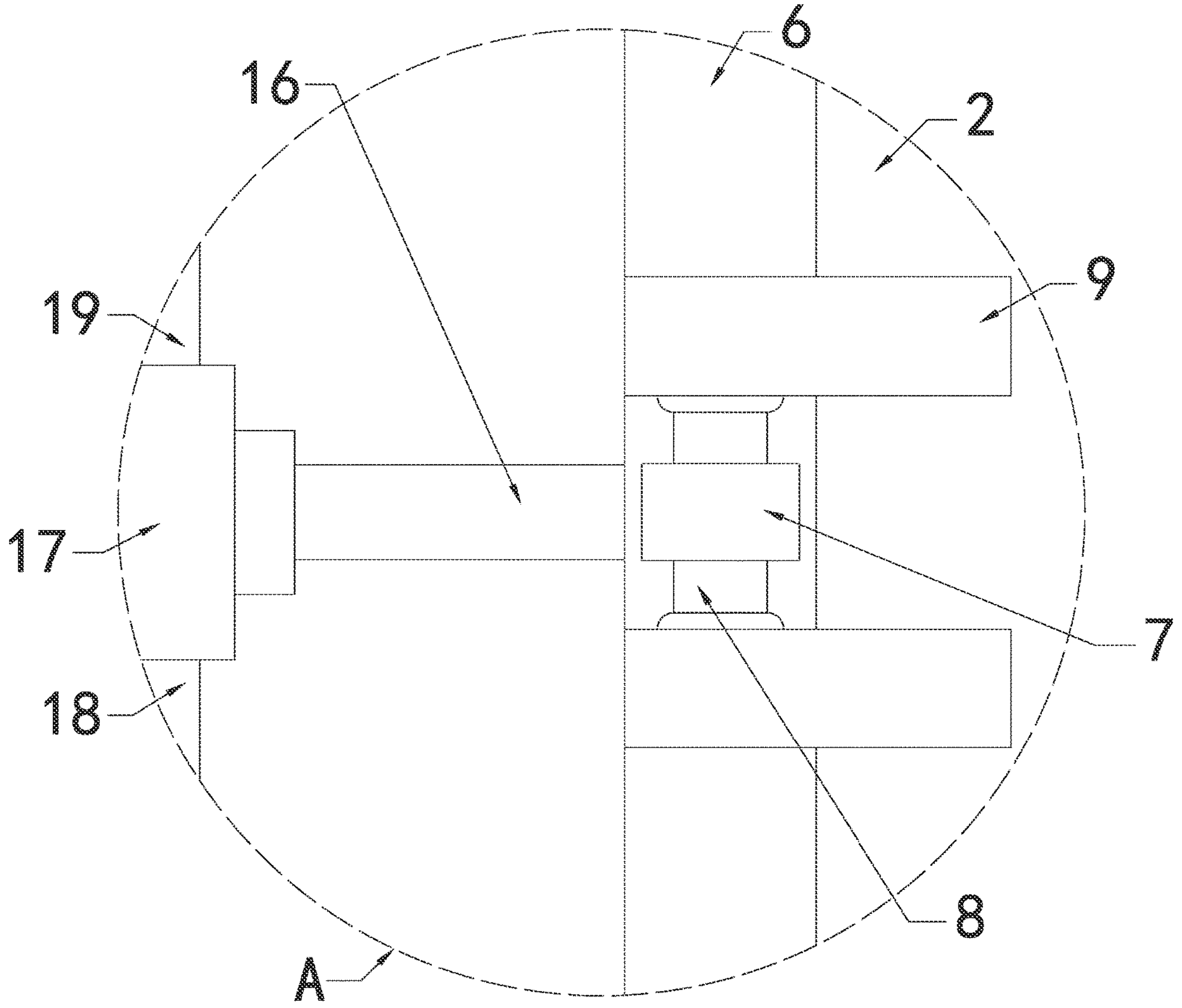
FIG. 4 is an enlarged structural view of point A in FIG. 1.

As shown in FIGS. 1-2 and FIG. 4, the first air guide mechanism includes a first corrugated pipe 14, a second corrugated pipe 15 and an air outlet pipe 16, wherein the cover plate 6 is fixedly sheathed with a wall at one end of the air outlet pipe 16, a first three-way pipe 17 is fixedly sheathed with a wall at the other end of the air outlet pipe 16, a first rigid conduit 18 and a second rigid conduit 19 are fixedly connected to the other two ports of the first three-way pipe 17 respectively, the other end of the first rigid conduit 18 is fixedly connected to the first corrugated pipe 14, the other end of the second rigid conduit 19 is fixedly connected to the second corrugated pipe 15, and the other end of the second corrugated pipe 15 extends into the drying box and is fixedly connected to the drying box 10. By using the first air guide mechanism, hot air inside the drying cylinder 2 can be guided into the drying box 10 for drying, so as to accelerate a drying process of bamboo.

Figure 5:
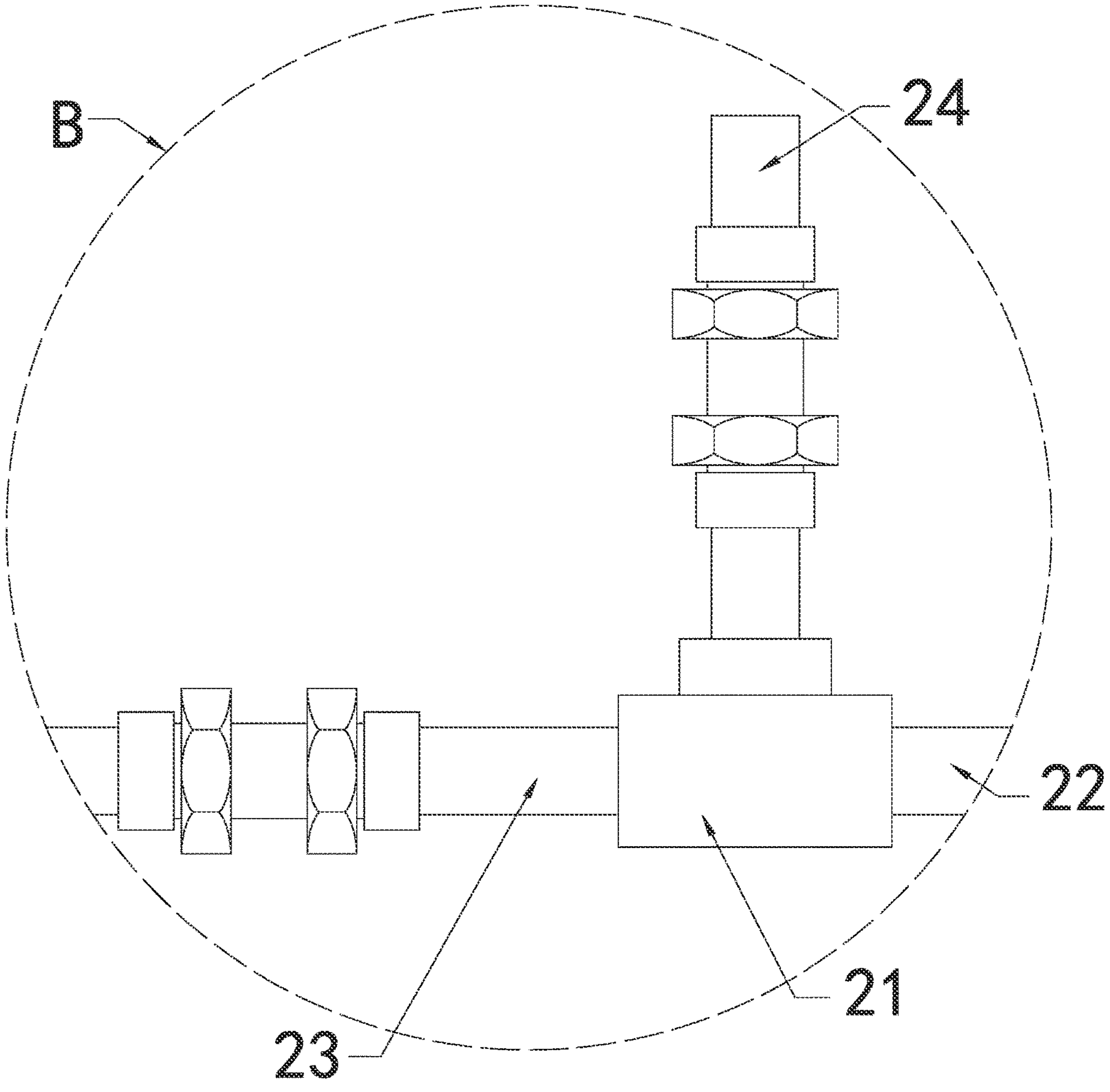
FIG. 5 is an enlarged structural view of point B in FIG. 1.

As shown in FIGS. 1-2 and FIG. 5, the second air guide mechanism includes a circulating fan 20, a second three-way pipe 21, a third rigid conduit 22, a fourth rigid conduit 23 and an air inlet pipe 24, wherein the circulating fan 20 is fixedly connected to a top outer wall of the drying cylinder 2, the third rigid conduit 22 and the air inlet pipe 24 are fixedly connected at both ends of the circulating fan respectively, the other end of the air inlet pipe 24 extends into the drying cylinder and is fixedly connected to the drying cylinder 2, a wall at the other end of the third rigid conduit 22 is fixedly connected with the fourth rigid conduit 23 through the second three-way pipe 21, the other end of the fourth rigid conduit 23 extends into the drying box and is fixedly connected to the drying box 10, and a cold air pipe 25 is fixedly connected to the other port of the second three-way pipe 21. By using the cold air pipe 25, the dried bamboo can be cooled, so that workers can take out the bamboo.

As shown in FIGS. 1-2, the driving mechanism includes a motor 26, a worm gear 27, a worm 28 and two fixing plates 29, wherein the two fixing plates 29 are fixedly connected to the upper surface of the base 1, the motor 26 is fixedly connected to a side wall of one of the fixing plates 29, the worm 28 is rotationally connected between the two fixing plates 29, one end of the worm passes through the corresponding fixing plates 29 and is fixedly connected to an output end of the motor 26, the worm gear 27 is fixedly sheathed with a wall of the rotating rod 12, and the worm 28 is meshed with the worm gear 27. The worm gear 27 can be driven to rotate in a rotation process of the worm 28 through meshing between the worm 28 and the worm gear 27, and the rotating rod 12 can be driven to rotate, so as to rotate the drying cylinder 2, so that the drying cylinder 2 is in a vertical state when drying the bamboo to ensure that hot air flows upward.

As shown in FIGS. 1-2, an opening is formed in a front side of the drying box 10, a sealing plate 30 is hinged inside the opening, and silica-gel desiccant is placed inside the drying box 10. By using the silica-gel desiccant, water vapor can be dried, and the silica-gel desiccant can be reused after being dried.

As shown in FIGS. 1-2, a support seat 31 is fixedly connected to the upper surface of the base 1 on the side far away from the two mounting plates 11, and a left end of the drying cylinder 2 is contact-connected with the support seat 31. By using the support seat 31, the drying cylinder 2 can be supported to ensure a stability of the drying cylinder 2.

As shown in FIGS. 1-2 and FIGS. 3-4, first solenoid valves are arranged on walls of the first rigid conduit 18 and the second rigid conduit 19, and second solenoid valves are arranged on walls of the third rigid conduit 22 and the fourth rigid conduit 23. By using the two first solenoid valves and the two second solenoid valves, opening and closing of the first rigid conduit 18, the second rigid conduit 19, the third rigid conduit 22 and the fourth rigid conduit 23 can be controlled, so that hot air can be circulated when the bamboo needs to be dried, and external cold air can be blown into the drying cylinder 2 when the dried bamboo needs to be cooled.

As shown in FIGS. 1-2, mounting blocks 32 are fixedly connected at both sides of the base 1, and a fastening bolt is fixedly connected inside each of the mounting blocks 32. By using the mounting blocks 32 and the corresponding fastening bolts, the whole device can be fixedly installed to ensure an operation stability of the whole device.

In summary, when the bamboo fiber production device is used, firstly, bamboo is placed inside a screen cylinder 4, a cover plate 6 is closed, and a motor 26 is started; an output end of the motor 26 drives a worm 28 to rotate, a worm gear 27 is driven to rotate in the rotation process of the worm 28, a rotating rod 12 is driven to rotate in the rotation process of the worm gear 27, two support plates 13 are driven to rotate in the rotation process of the rotating rod 12, and a drying cylinder 2 is rotated in the rotation process of the two support plates 13, so that the drying cylinder 2 is rotated to a vertical state. Next, a first solenoid valve on a wall of a first rigid conduit 18 and a second solenoid valve on a wall of a cold air pipe 25 are closed, and a first solenoid valve on a wall of a second rigid conduit 19 and a second solenoid valve on a wall of a fourth rigid conduit 23 are opened; two corresponding electric heating plates 3 are powered on and a circulating fan 20 is started, air inside the drying cylinder 2 is transported cyclically in the operation process of the circulating fan 20, and silica-gel desiccant inside a drying box 10 can absorb and dry water vapor in the cyclic transport process. Finally, upon completion of drying, the first solenoid valve on the wall of the first rigid conduit 18 and the second solenoid valve on the wall of the cold air pipe 25 are opened, and the first solenoid valve on the wall of the second rigid conduit 19 and the second solenoid valve on the wall of the fourth rigid conduit 23 are closed; cold air outside the drying cylinder 2 can be pumped into the drying cylinder 2 and discharged through a first corrugated pipe 14 in the operation process of the circulating fan 20, so that the drying cylinder 2 can be internally cooled to facilitate cooling of the bamboo; upon completion of bamboo cooling, the motor 26 is started to work in reverse, and the drying cylinder 2 is rotated to a horizontal state so that workers can take out the bamboo.

Compared with the existing technical solutions, in the technical solution of the present invention, hot air can be circulated in the drying process, so that the drying speed of bamboo can be effectively improved, and wires of the electric heating plates 3 will not wind in the drying process; moreover, the bamboo can be cooled after drying, so that workers can take out the bamboo from the drying cylinder 2.

It should be noted that the term "include" or any other variants thereof are intended to cover non-exclusive inclusion, so that a process, a method, an article or a device including a series of elements includes not only those elements but also other elements not explicitly listed or inherent to the process, the method, the article or the device. In the absence of further restrictions, the elements restricted by the statement "include a/an . . . " do not exclude the existence of other identical elements in a process, a method, an article or a device including the mentioned element.

Although the embodiments of the present invention have been shown and described, those of ordinary skill in the art should understand that they may make various changes, modifications, substitutions and transformations to these embodiments without departing from the principle and spirit of the present invention. The scope of the present invention is limited by the attached claims and equivalents thereof.

What is claimed is:

1. A bamboo fiber production device, comprising: a base and a drying cylinder, wherein two electric heating plates are fixedly connected to an inner right side wall of the drying cylinder symmetrically, a screen cylinder is arranged inside the drying cylinder, two groups of connecting rods are fixedly connected to a side wall of the screen cylinder symmetrically, and one end of each of the connecting rods is fixedly connected to an inner wall of the drying cylinder;

wherein a cover plate is arranged on a left end of the drying cylinder, a connecting block is fixedly connected to a front side of the cover plate, a shaft pin is fixedly sheathed with the connecting block, L-shaped plates are rotationally connected to rod walls at both ends of the shaft pin respectively, and the L-shaped plates are fixedly connected to an outer wall of the drying cylinder;

wherein a drying box is fixedly connected to a top outer wall of the drying cylinder, and a first air guide mechanism and a second air guide mechanism communicated with an interior of the drying box are fixedly connected at both ends of the drying box respectively;

wherein the drying cylinder is arranged above the base, two mounting plates are fixedly connected to an upper surface of the base symmetrically, a rotating rod is rotationally connected between the two mounting plates, two support plates are fixedly sheathed with a wall of the rotating rod symmetrically, and tops of the two support plates are fixedly connected to a bottom outer wall of the drying cylinder; a driving mechanism is arranged on the upper surface of the base, and the driving mechanism is transmission-connected with the rotating rod.

2. The bamboo fiber production device according to claim 1, wherein the first air guide mechanism comprises a first corrugated pipe, a second corrugated pipe and an air outlet pipe, wherein the cover plate is fixedly sheathed with a wall at one end of the air outlet pipe, a first three-way pipe is fixedly sheathed with a wall at another end of the air outlet pipe, a first rigid conduit and a second rigid conduit are fixedly connected to the other two ports of the first three-way pipe respectively, one end of the first rigid conduit is fixedly connected to the first corrugated pipe, one end of the second rigid conduit is fixedly connected to the second corrugated pipe, and one end of the second corrugated pipe extends into the drying box and is fixedly connected to the drying box.

3. The bamboo fiber production device according to claim 1, wherein the second air guide mechanism comprises a circulating fan, a second three-way pipe, a third rigid conduit, a fourth rigid conduit and an air inlet pipe, wherein the circulating fan is fixedly connected to a top outer wall of the drying cylinder, the third rigid conduit and the air inlet pipe are fixedly connected at both ends of the circulating fan respectively, one end of the air inlet pipe extends into the drying cylinder and is fixedly connected to the drying cylinder, a wall at one end of the third rigid conduit is fixedly connected with the fourth rigid conduit through the second three-way pipe, one end of the fourth rigid conduit extends into the drying box and is fixedly connected to the drying box, and a cold air pipe is fixedly connected to the other port of the second three-way pipe.

4. The bamboo fiber production device according to claim 1, wherein the driving mechanism comprises a motor, a worm gear, a worm and two fixing plates, wherein the two fixing plates are fixedly connected to the upper surface of the base, the motor is fixedly connected to a side wall of one of the two fixing plates, the worm is rotationally connected between the two fixing plates, one end of the worm passes through the other one of the two fixing plates and is fixedly connected to an output end of the motor, the worm gear is fixedly sheathed with a wall of the rotating rod, and the worm is meshed with the worm gear.

5. The bamboo fiber production device according to claim 1, wherein an opening is formed in a front side of the drying box, a sealing plate is hinged inside the opening, and silica-gel desiccant is placed inside the drying box.

6. The bamboo fiber production device according to claim 1, wherein a support seat is fixedly connected to the upper surface of the base, and a left end of the drying cylinder is contact-connected with the support seat.

7. The bamboo fiber production device according to claim 2, wherein first solenoid valves are arranged on walls of the first rigid conduit and the second rigid conduit.

8. The bamboo fiber production device according to claim 3, wherein second solenoid valves are arranged on walls of the third rigid conduit and the fourth rigid conduit.

9. The bamboo fiber production device according to claim 1, wherein mounting blocks are fixedly connected at both sides of the base, and a fastening bolt is fixedly connected inside each of the mounting blocks.

* * * * *